United States Patent
Liu et al.

(10) Patent No.: US 12,209,549 B2
(45) Date of Patent: Jan. 28, 2025

(54) COMBUSTION SYSTEM DESIGN METHOD BASED ON TARGET HEAT RELEASE RATE

(71) Applicant: Harbin Engineering University, Harbin (CN)

(72) Inventors: Long Liu, Harbin (CN); Yan Peng, Harbin (CN); Changfu Han, Harbin (CN); Haicheng Qi, Harbin (CN); Li Huang, Harbin (CN); Wenzheng Zhang, Harbin (CN)

(73) Assignee: Harbin Engineering University, Harbin (CN)

( * ) Notice: Subject to any disclaimer, the term of this patent is extended or adjusted under 35 U.S.C. 154(b) by 268 days.

(21) Appl. No.: 18/085,628

(22) Filed: Dec. 21, 2022

(65) Prior Publication Data

US 2023/0184190 A1  Jun. 15, 2023

(30) Foreign Application Priority Data

Dec. 24, 2021 (CN) .......................... 202111602595.4

(51) Int. Cl.
*F02D 41/24* (2006.01)
*F02D 41/26* (2006.01)
(Continued)

(52) U.S. Cl.
CPC ..... *F02D 41/2451* (2013.01); *F02D 41/2441* (2013.01); *F02D 41/248* (2013.01);
(Continued)

(58) Field of Classification Search
CPC .... F02D 35/024; F02D 35/028; F02D 35/026; F02D 35/02; F02D 41/1406; F02D 41/26;
(Continued)

(56) References Cited

U.S. PATENT DOCUMENTS

| | | | |
|---|---|---|---|
| 4,050,420 A * | 9/1977 | Cataldo | F02B 41/00 123/193.6 |
| 8,985,072 B2 * | 3/2015 | Okada | F02F 3/24 123/193.6 |

(Continued)

*Primary Examiner* — Logan M Kraft
*Assistant Examiner* — Johnny H Hoang
(74) *Attorney, Agent, or Firm* — IPRO, LLC (57) ABSTRACT

Disclosed is a combustion system design method based on a target heat release rate, which belongs to the technical field of diesel engine combustion chamber design. The method includes: obtaining an ideal heat release rate based on Sabathe-Miller cycle; simulating the ideal heat release rate based on a double-Wiebe function and obtaining the target heat release rate; constructing a mapping relation among the heat release rate, piston geometric parameters and fuel injection parameters, which includes target start of combustion being an function of fuel injection timing and ignition delay, premixed combustion parameters being functions of throat radius, injection pressure and nozzle diameter, and diffusion combustion being a function of piston pit depth; solving target piston geometric parameters and target fuel injection parameters based on the mapping relation; and then designing a combustion system. The method does not depend on experience and multi-scheme design, greatly shortens the combustion system design.

10 Claims, 3 Drawing Sheets

(51) Int. Cl.
*G06F 30/17* (2020.01)
*G06F 111/10* (2020.01)

(52) U.S. Cl.
CPC ............. *F02D 41/26* (2013.01); *G06F 30/17* (2020.01); *G06F 2111/10* (2020.01)

(58) Field of Classification Search
CPC .............. F02D 41/2441; F02D 41/248; F02D 41/2451; F02D 2041/1433; F02D 13/0269; G05B 17/02; F02F 3/00; F02F 3/24; B23P 15/10; F23N 5/242; F23N 2241/20; F23N 2223/40; F23N 2231/28; Y02T 50/60; Y02T 10/12; F22G 1/12; F22G 1/14; F24V 30/00; C01B 3/08; C01B 2203/0216; C01B 2203/84; C01B 2203/08; F01K 21/04; F01K 23/10; F01K 25/06; Y02E 60/36; Y02P 20/129; G06F 30/17; G06F 30/20; G06F 2111/10
See application file for complete search history.

(56) References Cited

U.S. PATENT DOCUMENTS

| | | | |
|---|---|---|---|
| 10,208,701 B2* | 2/2019 | Oyagi | F02D 41/0007 |
| 11,017,132 B2* | 5/2021 | Kordon | F02D 41/26 |
| 2009/0274985 A1* | 11/2009 | McKnight | F23G 7/10 |
| | | | 431/185 |
| 2015/0234953 A1* | 8/2015 | Speetzen | G06F 17/10 |
| | | | 703/2 |
| 2020/0232416 A1* | 7/2020 | Primus | F02B 23/0687 |
| 2022/0074366 A1* | 3/2022 | Primus | F02B 23/0687 |

* cited by examiner

COMBUSTION SYSTEM DESIGN METHOD BASED ON TARGET HEAT RELEASE RATE

TECHNICAL FIELD

The disclosure relates to the technical field of diesel engine combustion chamber design, and more particularly relates to a combustion system design method based on a target heat release rate.

BACKGROUND

A marine diesel engine is a main power source of a ship, and along with increasingly strict emission regulations, a close attention is paid to developing an efficient and clean combustion manner. Combustion system configuration decides a combustion process, which greatly influences power performance, economical efficiency and emission performance of the diesel engine, and thus, combustion system design is particularly important. Reverse design is adopted for combustion system at present, in which parameter crossed combinations are firstly performed on combustion chamber geometrical parameters and oil injection strategies to form different combustion system schemes, then, simulating calculation is performed on the generated schemes, and a preferred combustion system scheme is selected according to a simulation result. The design manner of a combustion system has the advantages that operation is simple, and a mechanism relation between combustion system configuration and a combustion process does not need to be focused; but the design manner also has obvious defects that a large number of schemes are generated due to many parameter combinations, there may be 200 or more retrofit machine development schemes while more new machine development schemes exist, which will increase calculation resource demands, meanwhile, calculation time is long due to three-dimensional simulating calculation for combustion system design, and calculation time is exponentially increased for a diesel engine with a large cylinder diameter, which will seriously prolong a combustion system research and development period; and the reverse design of the combustion system does not focus on the mechanism relation between combustion system configuration and the combustion process, and thus combustion system design results strongly depend on experience.

SUMMARY

The disclosure aims to at least solve one of technical problems in related technologies to a certain degree.

Accordingly, the disclosure aims to provide a combustion system design method based on a target heat release rate, which does not depend on experience, does not need multi-scheme design, greatly shortens calculation time, and shortens a combustion system research and development period.

To achieve the above purpose, the embodiment of the disclosure provides a combustion system design method based on a target heat release rate. The combustion system design method includes following steps: step S1: obtaining an optimal and ideal heat release rate based on a Miller and Sabathe cycle coupled model; step S2: simulating the optimal and ideal heat release rate based on a double-Wiebe function and obtaining the target heat release rate; step S3: constructing a mapping relation among the heat release rate, piston geometric parameters and oil injection parameters, where, the mapping relation includes a target combustion starting point being an oil injection timing and ignition delay period function, a premixed combustion duration being a combustion chamber throat radius, oil injection pressure and injection orifice diameter function, a premixed combustion mass being an oil injection pressure and injection orifice diameter function, and diffusion combustion being a piston pit depth function; step S4: solving target piston geometric parameters and target oil injection parameters based on the mapping relation and the target heat release rate; and step S5: designing a combustion system according to the target piston geometric parameters and the target oil injection parameters.

The combustion system design method based on the target heat release rate according to the embodiment of the disclosure performs, based on variable air distribution, a thermal efficiency analysis on a theoretical work cycle to obtain the ideal heat release rate; and simulates, by a diesel engine combustion model double-Wiebe curve, the ideal heat release rate to obtain the target heat release rate, establishes the mapping relation among the heat release rate, the oil injection parameters and the piston geometric characteristic parameters based on the theoretical analysis, and obtains combustion system characteristic parameters based on the target heat release rate and the mapping relation, thereby finishing the combustion system design. The combustion system design method focuses on a mechanism relation between the combustion system characteristic parameters and combustion, does not depend on experience, does not need multi-scheme design, greatly shortens calculation time, and shortens the combustion system research and development period.

In addition, the combustion system design method based on the target heat release rate according to the embodiment of the disclosure may further have following additional technical features:

Furthermore, in one embodiment of the disclosure, the step S1 specifically includes: step S101: constructing an effective thermal efficiency calculating zero-dimensional model based on a Miller and Sabathe coupled cycle; and step S102: analyzing an influence rule of an isochoric degree and a Miller degree on effective thermal efficiency based on the effective thermal efficiency calculating zero-dimensional model, and obtaining the optimal and ideal heat release rate.

Furthermore, in one embodiment of the disclosure, an isochoric degree is a ratio of an isochoric combustion fuel mass to a total fuel mass, and a Miller degree is an intake Valve Close (IVC) time volume ratio of a conventional cycle to a Miller cycle.

Furthermore, in one embodiment of the disclosure, the step S2 specifically includes: step S201: simulating the ideal heat release rate by the double-Wiebe function based on a one-dimensional GT simulation model and obtaining Wiebe function characteristic parameters; and step S202: optimizing the Wiebe function characteristic parameters in combination with preset diesel engine limiting conditions; and step S203: obtaining the target heat release rate according to the optimized Wiebe function characteristic parameters.

Furthermore, in one embodiment of the disclosure, the Wiebe function is:

$$\frac{dx_1}{d\varphi} = \left[(m_p+1)*6.908*\left(\frac{1}{2\tau}\right)^{m_p+1}(\varphi-\varphi_B)^{m_p}e^{-6.908\left(\frac{1}{2\tau}\right)^{m_p+1}(\varphi-\varphi_B)^{m_p+1}}\right](1-Q_d)$$

$x_1$ is a heat release volume, $m_p$ is a constant, $\tau$ is ignition delay, $\varphi$ is a crank angle, $\varphi_B$ is a crank angle corresponding to a combustion starting point, and $Q_d$ is a combusted fuel mass fraction.

Furthermore, in one embodiment of the disclosure, the step S3 specifically includes: step S301: dividing a heat release rate into a premixed stage and a diffuse stage with a spray wall-impact time as a dividing point, and respectively studying relations among characteristic parameters in the premixed stage, oil injection parameters and combustion chamber shape parameters and among characteristic parameters in the diffuse stage, the oil injection parameters and the combustion chamber shape parameters; and step S302: determining a target combustion starting point being an oil injection timing and ignition delay period function, a premixed combustion duration being a combustion chamber throat radius, oil injection pressure and injection orifice diameter function, and a premixed combustion mass being an oil injection pressure and injection orifice diameter function in the premixed stage, and determining diffusion combustion being a piston pit depth function in the diffuse stage.

Furthermore, in one embodiment of the disclosure, the target combustion starting point is the oil injection timing and ignition delay period function:

$$\theta_{SOC}=\theta_{SOI}+\theta_{id}$$

$$\theta_{id}=C_1 \exp(C_2/T_a)d_0^{C_3}\rho_A^{C_4}P_{inj}^{C_5}O_2^{C_6}$$

$\theta_{SOC}$ is a combustion starting point, $\theta_{SOI}$ is an oil injection starting point, $\theta_{id}$ is an ignition delay period, $C_1$-$C_6$ are constants, $T_a$ is an environmental temperature, $\rho_A$ is an environmental density, $d_0$ is an injection orifice diameter, $P_{inj}$ is an injection pressure, and $O_2$ is an oxygen concentration.

Furthermore, in one embodiment of the disclosure, when a combustion chamber throat is a wall-impact position, the premixed combustion duration is the combustion chamber throat radius, oil injection pressure and injection orifice diameter function:

$$\sqrt{(r_{th})^2+(x(\varphi)+I_{cl})^2}=K_p((P_i-P_a)/\rho_A)^{0.25}d_0^{0.5}t^{0.5}$$

$r_{th}$ is a combustion chamber throat radius, $x(\varphi)$ is a piston displacement at a crank corner, $I_{cl}$ is a clearance height, $K_p$ is a constant, $P_i$ is an injection pressure, $P_a$ is a backpressure, $\rho_a$ is an environmental density, $\rho_A$ is an environmental density, $d_0$ is an injection orifice diameter, and t is a duration from an oil injection starting point to a wall-impact time, namely the sum of the premixed combustion duration and an ignition delay period.

Furthermore, in one embodiment of the disclosure, the premixed combustion mass is the oil injection pressure and injection orifice diameter function:

$$m_{net}=k_\rho d_0^2(P_i-P_a)^{0.5} \cdot \left(0.5a \cdot \ln\left(\frac{P_i-P_a}{K_p\rho_A d_0}\right)-b\right)$$

$m_{net}$ is a premixed combustion mass, $k_\rho$ is a model parameter, $d_0$ is an injection orifice diameter, $P_i$ an injection pressure, $P_a$ is a backpressure, a, b and $K_p$ are constants, and $\rho_A$ is an environmental density.

Furthermore, in one embodiment of the disclosure, the diffusion combustion is the piston pit depth function:

$$HRR \propto m\left(\frac{\sqrt{0.5k_{f_{w2}}}}{\sqrt[3]{V_2}}+\frac{\sqrt{0.5k_{f_{w1}}}}{\sqrt[3]{V_1}}\right)$$

HRR is a diffusion combustion heat release rate, m is a diffusion combustion fuel mass, $k_{f_{w1}}$ and $k_{f_{w2}}$ are turbulence intensities corresponding to discrete volumes respectively, $V_1$ and $V_2$ are discrete volumes respectively, and the function is about a piston pit depth.

Part of additional aspects and advantages of the disclosure will be given in following descriptions, and part of the additional aspects and the advantages become obvious from the following descriptions or are known through application of the disclosure.

BRIEF DESCRIPTION OF FIGURES

The above contents and/or additional aspects and advantages of the disclosure become obvious and easy to understand in descriptions of embodiments by combining drawings.

DETAILED DESCRIPTION

Embodiments of the disclosure are described in detail below, examples of the embodiments are shown in drawings, and mark numbers being the same or similar from beginning to end show same or similar members or members with same or similar functions. The following embodiments described in reference to the drawings are exemplary, and aim to explain the disclosure instead of limiting the disclosure.

A combustion system design method based on a target heat release rate according to one embodiment of the disclosure is described by referring drawings.

Figure 1:
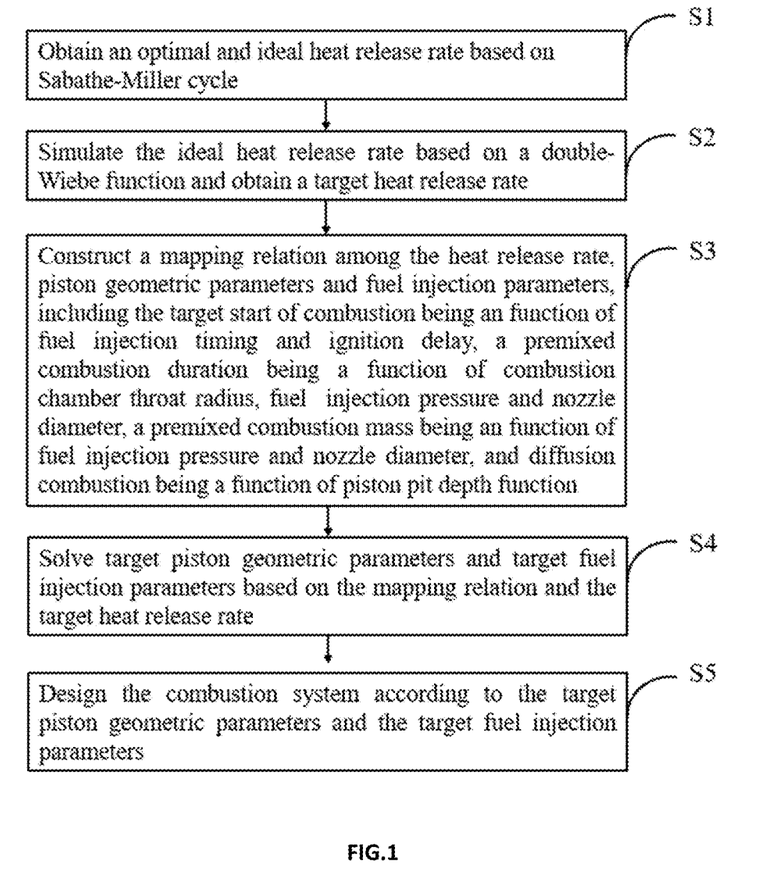
FIG. 1 is a flowchart of a combustion system design method based on a target heat release rate according to one embodiment of the disclosure.

FIG. 1 is a flowchart of a combustion system design method based on a target heat release rate according to one embodiment of the disclosure.

As shown in FIG. 1, the combustion system design method based on the target heat release rate includes following steps:

Step S1: An optimal and ideal heat release rate is obtained based on a Miller and Sabathe cycle coupled model.

Furthermore, in one embodiment of the disclosure, the step S1 specifically includes:

Step S101: An effective thermal efficiency calculating zero-dimensional model is constructed based on a Miller and Sabathe coupled cycle.

Step S102: An influence rule of an isochoric degree and a Miller degree on effective thermal efficiency is analyzed based on the effective thermal efficiency calculating zero-dimensional model, and the optimal and ideal heat release rate is obtained.

Figure 2:
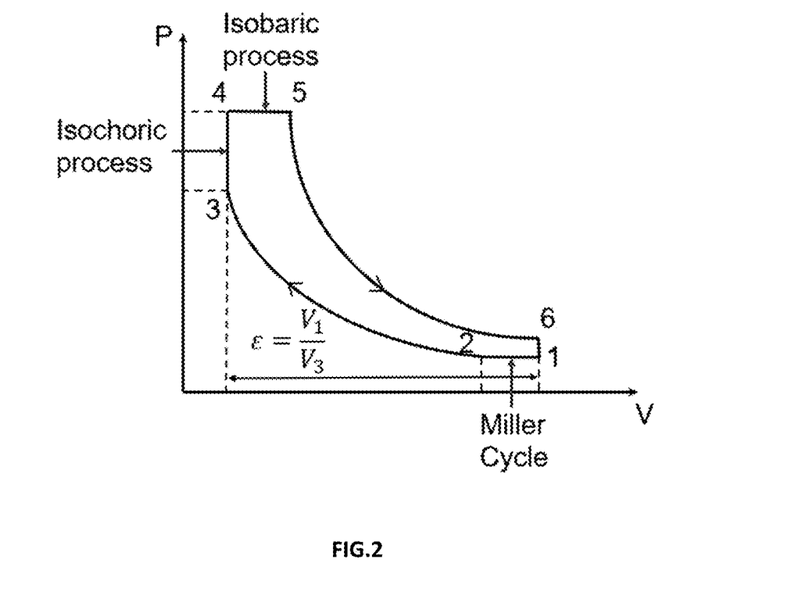
FIG. 2 is a schematic diagram based on a Miller and Sabathe coupled cycle according to one embodiment of the disclosure.

Specifically, as shown in FIG. 2, optimized independent variables of the effective thermal efficiency calculating zero-dimensional model constructed on the basis of the Miller and Sabathe coupled cycle according to the embodiment of the disclosure include an isochoric degree $x_{iv}$ being a ratio of an isochoric combustion fuel mass to a total fuel mass and a Miller degree $r_m$ being an IVC time volume ratio of a conventional cycle to a Miller cycle. Matching between the isochoric degree and the Miller degree corresponding to the optimal thermal efficiency can be obtained by analyzing the influence rule of the isochoric degree and the Miller degree on effective thermal efficiency, thereby obtaining an optimal heat release rate for ideal cycle.

$$x_{iv} = \frac{m_{34}}{m_{tot}}$$

$$r_m = \frac{v_o}{v_m}$$

In the step S2, the optimal and ideal heat release rate based on a double-Wiebe function is simulated to obtain a target heat release rate.

Furthermore, in one embodiment of the disclosure, the step S2 specifically includes:

Step S201: An ideal heat release rate by a double-Wiebe function based on a one-dimensional GT simulation model is simulated to obtain Wiebe function characteristic parameters.

Step S202: The Wiebe function characteristic parameters are optimized in combination with preset diesel engine limiting conditions.

Step S203: A target heat release rate is obtained according to the optimized Wiebe function characteristic parameters.

In other words, the final target heat release rate, namely the target heat release rate is obtained by simulating the ideal heat release rate by the double-Wiebe function based on the one-dimensional GT simulation model and then optimizing the Wiebe function characteristic parameters in combination with the limiting conditions. The Wiebe function is:

$$\frac{dx_1}{d\varphi} = \left[ (m_p+1)*6.908*\left(\frac{1}{2\tau}\right)^{m_p+1}(\varphi-\varphi_B)^{m_p}e^{-6.908\left(\frac{1}{2\tau}\right)^{m_p+1}(\varphi-\varphi_B)^{m_p+1}} \right](1-Q_d)$$

$x_1$ is a heat release volume, $m_p$ is a constant, $\tau$ is ignition delay, $\varphi$ is a crank angle, $\varphi_B$ is a crank angle corresponding to a combustion starting point, and $Q_d$ is a combusted fuel mass fraction.

In a step S3, a mapping relation among the heat release rate, piston geometric parameters and oil injection parameters is constructed, where, the mapping relation includes a target combustion starting point being an oil injection timing and ignition delay period function, a premixed combustion duration being a combustion chamber throat radius, oil injection pressure and injection orifice diameter function, a premixed combustion mass being an oil injection pressure and injection orifice diameter function, and diffusion combustion being a piston pit depth function.

Furthermore, in one embodiment of the disclosure, the step S3 specifically includes:

Step S301: A heat release rate is divided into a premixed stage and a diffuse stage with a spray wall-impact time as a dividing point, and relations among characteristic parameters in the premixed stage, oil injection parameters and combustion chamber shape parameters and among characteristic parameters in the diffuse stage, the oil injection parameters and the combustion chamber shape parameters are respectively studied.

Step S302: A target combustion starting point being an oil injection timing and ignition delay period function, a premixed combustion duration being a combustion chamber throat radius, oil injection pressure and injection orifice diameter function, and a premixed combustion mass being an oil injection pressure and injection orifice diameter function in the premixed stage is determined, and diffusion combustion being a piston pit depth function in the diffuse stage is determined.

In other words, the heat release rate is divided into the premixed stage and the diffuse stage with the spray wall-impact time as the dividing point, and the relations among the characteristic parameters in the premixed stage, the oil injection parameters and the combustion chamber shape parameters and among the characteristic parameters in the diffuse stage, the oil injection parameters and the combustion chamber shape parameters are respectively studied, where, the target combustion starting point is the oil injection timing and ignition delay period function, the premixed combustion duration and the combustion chamber throat radius are in the oil injection pressure and injection orifice diameter function, the premixed combustion mass is the oil injection pressure and injection orifice diameter function, and the diffusion combustion is the piston pit depth function.

Furthermore, the combustion starting point, oil injection timing and ignition delay period function is:

$$\theta_{SOC} = \theta_{SOI} + \theta_{id}$$

$$\theta_{id} = C_1 \exp(C_2/T_a) d_0^{C_3} \rho_A^{C_4} P_{inj}^{C_5} O_2^{C_6}$$

$\theta_{SOC}$ is a combustion starting point, $\theta_{SOI}$ is an oil injection starting point, $\theta_{id}$ is an ignition delay period, $C_1$-$C_6$ are constants, $T_a$ is an environmental temperature, $\rho_A$ is an environmental density, $d_0$ is an injection orifice diameter, $P_{inj}$ is an injection pressure, and $O_2$ is an oxygen concentration.

Figure 3:
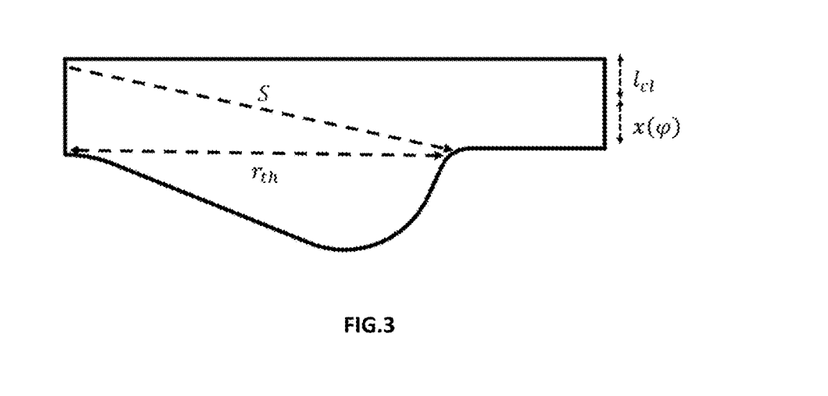
FIG. 3 is a schematic diagram of a heat release rate according to one embodiment of the disclosure.

As shown in FIG. 3, it is theoretically analyzed that a premixed combustion end point is a spray wall-impact point, and when a wall-impact position is a throat position, following relations are established:

$$l_{imp} = \sqrt{(r_{th})^2 + (x(\varphi) + l_{c1})^2}$$

$$S = K_p((P_i - P_a)\rho_A)^{0.25} d_0^{0.5} t^{0.5}$$

$l_{imp}$ is a distance from an injection orifice to a wall-impact position, S is a spray penetration distance, $r_{th}$ is a combustion chamber throat radius, $x(\varphi)$ is a piston displacement at a crank corner, $l_{c1}$ is a clearance height, $K_p$ is a constant, $P_i$ is an injection pressure, $P_a$ is a backpressure, $\rho_A$ is an environmental density, $d_0$ is an injection orifice diameter, and t is a duration from an oil injection starting point to a spray wall-impact time.

The two equations are made to be equal, and a premixed combustion duration from the combustion starting point to the spray wall-impact time is established, and is the combustion chamber throat radius, oil injection pressure and injection orifice diameter function. Namely, the spray penetration distance is equal to the distance from the injection orifice to the wall-impact position at the premixed combustion ending time. When a combustion chamber throat is a spray wall-impact position, the spray wall-impact position and the combustion chamber throat radius are in a function corresponding to the oil injection pressure and the injection orifice diameter, which is specifically shown as below:

$$\sqrt{(r_{th})^2+(x(\varphi)+l_{cl})^2}=K_p((P_i-P_a)/\rho_A)^{0.25}d_0^{0.5}t^{0.5}$$

$r_{th}$ is a combustion chamber throat radius, $x(\varphi)$ is a piston displacement at a crank corner, $l_{cl}$ is a clearance height, $K_p$ is a constant, $P_i$ is an injection pressure, $P_a$ is a backpressure, $\rho_A$ is an environmental density, $d_0$ is an injection orifice diameter, and t is a duration from an oil injection starting point to a wall-impact time, namely the sum of the premixed combustion duration and an ignition delay period.

As shown in FIG. 3, the premixed combustion mass, oil injection pressure and injection orifice diameter function is established according to a jet flow theoretical analysis, where, the premixed combustion mass is defined as a fuel mass for premixed combustion within an equivalent ratio range on a spray periphery at the spray wall-impact time, and is solved in a manner of establishing a conical simplified one-dimensional model on the spray and performing integration on an axial direction and a radial direction, which is specifically shown as below:

$$m_{net} = k_\rho d_0^2 (P_i - P_a)^{0.5} \cdot \left( 0.5a \cdot \ln\left(\frac{P_i - P_a}{K_p \rho_A d_0}\right) - b \right)$$

$m_{net}$ is a premixed combustion mass, $k_\rho$ is a model parameter, $d_0$ is an injection orifice diameter, $P_i$ is an injection pressure, $P_a$ is a backpressure, a, b and $K_p$ are constants, and $\rho_A$ is an environmental density.

Figure 4:
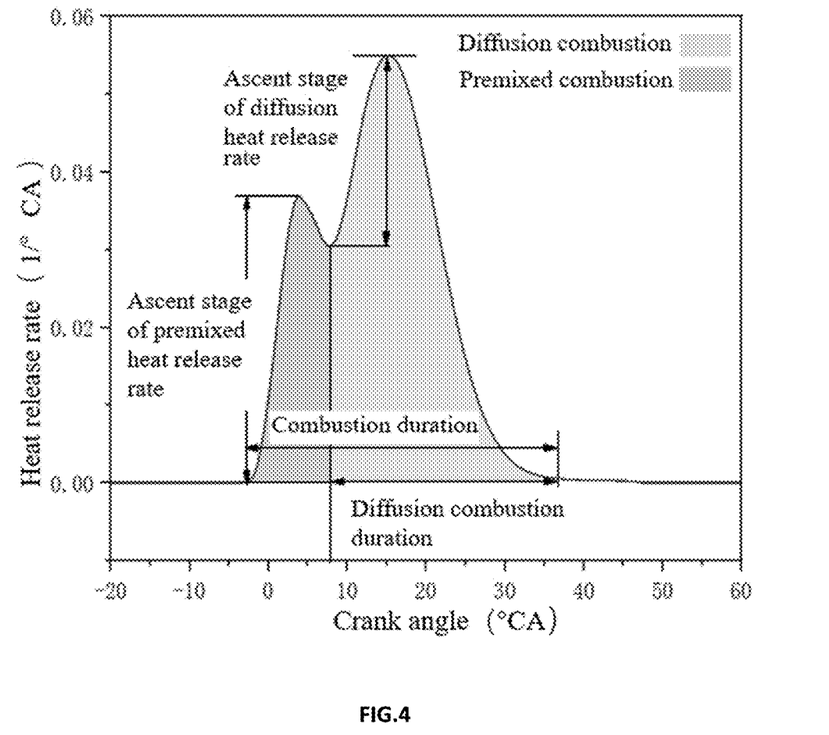
FIG. 4 is a schematic diagram of jet flow and a combustion chamber according to one embodiment of the disclosure.
Figure 5:
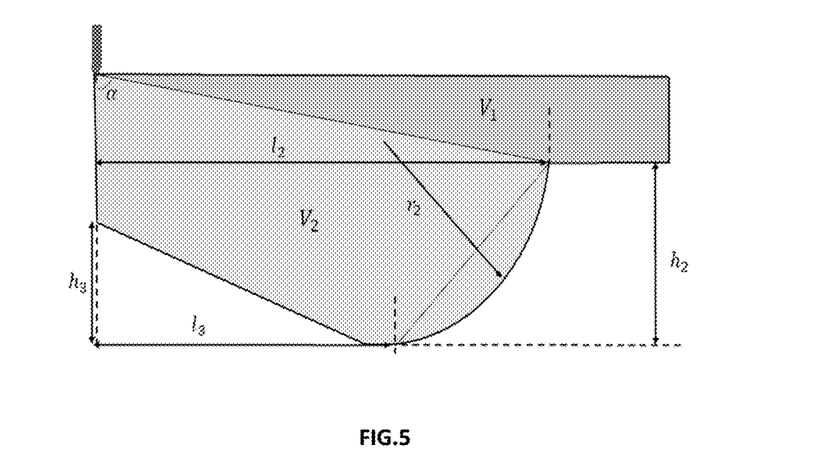
FIG. 5 is a schematic diagram of combustion chamber discretization according to one embodiment of the disclosure.

Furthermore, as shown in FIG. 4, it can be obtained, according to a jet flow theory, that a characteristic hybrid parameter representing a diffusion combustion mixing process is a ratio $$\frac{\sqrt{k_f}}{\sqrt[3]{V_t}}$$

of a turbulence intensity to a turbulence length. As shown in FIG. 5, a piston combustion chamber is discretized, then, a characteristic hybrid parameter representing a diffusion combustion mixing process is a weighted sum of ratios of discrete turbulence intensities to a turbulence length, and thus, diffusion combustion is a piston pit depth function:

$$HRR \propto m \left( \frac{\sqrt{0.5k_{fw2}}}{\sqrt[3]{V_2}} + \frac{\sqrt{0.5k_{fw1}}}{\sqrt[3]{V_1}} \right)$$

HRR is a diffusion combustion heat release rate, m is a diffusion combustion fuel mass, $k_{f_{w1}}$ and $k_{f_{w2}}$ are turbulence intensities corresponding to discrete volumes respectively, $V_1$ and $V_2$ are discrete volumes respectively, and the function is about a piston pit depth.

Computational formulas corresponding to $V_1$ and $V_2$ are as below:

$$V_1 = 0.135^2 \pi \cdot (l_{cl} + x(\varphi)) - \frac{1}{3}\pi l_2^2(l_{cl} + x(\varphi))$$

$$V_2 = \pi l_2^2 h_2 - \frac{1}{2}(\pi l_2^2 h_2 - \pi l_3^2 h_3) + \frac{1}{3}\pi l_2^2(l_{cl} + x(\varphi)) - \frac{1}{3}\pi l_3^2 h_3$$

$$h_1 = \cos\alpha \cdot l_{imp}$$

$$l_2 = \sin\alpha \cdot l_{imp}$$

In a step S4, target piston geometric parameters and target oil injection parameters are solved based on the mapping relation and the target heat release rate.

In a step S5, a combustion system is designed according to the target piston geometric parameters and the target oil injection parameters.

In other words, parameter values are reversely deduced according to the mapping relation among the heat release rate, the oil injection characteristic parameters and the piston geometric characteristic parameters on the basis of the target heat release rate, and a combustion system design scheme capable of realizing the target heat release rate can be obtained according to the parameter values.

In conclusion, the combustion system design method based on the target heat release rate according to the embodiment of the disclosure is a combustion system forward design method, focuses on the mechanism relation between the combustion system characteristic parameters and combustion, does not depend on experience, does not need multi-scheme design, greatly shortens calculation time, shortens a combustion system research and development period, and overcomes defects of a conventional combustion system reverse design method, and a scientific and accurate combustion system design method is provided for combustion system designers.

In addition, terms "first" and "second" are merely used for describing the purpose but not understood as indicating or implying relative importance or implying to indicate the number of indicated technical features. Thus, features limited with "first" and "second" may explicitly or invisibly include at least one feature. In the description of the disclosure, "a plurality of" means at least two, such as two or three, except additional clear and specific limitations.

In the description of the specification, descriptions of reference terms "one embodiment", "some embodiments", "example", "specific example" or "some examples" or the like imply that specific features, structures, materials or characteristics combined with the embodiment or the example are included in at least one embodiment or example of the disclosure. In the specification, schematic statements for the above terms are not necessarily specific to the same embodiment or example. Moreover, the described specific features, structures, materials or characteristics can be combined in a proper manner in any one or more embodiments or examples. In addition, those skilled in the art can combine different embodiments or examples described in the specification and features of different embodiments or examples under the situation that mutual contradiction does not exist.

Although the embodiments of the disclosure are shown and described above, it can be understood that the above embodiments are illustrative and cannot be understood as limitations on the disclosure, and those ordinarily skilled in the art can change, modify, replace and transform the above embodiments in the scope of the disclosure.

What is claimed is:

1. A combustion system design method based on a target heat release rate, comprising following steps:
   step S1: obtaining an optimal and ideal heat release rate based on a Miller and Sabathe cycle coupled model;
   step S2: simulating the optimal and ideal heat release rate based on a double-Wiebe function and obtaining the target heat release rate;
   step S3: constructing a mapping relation among the target heat release rate, piston geometric parameters and oil injection parameters, wherein, the mapping relation comprises a target combustion starting point being an oil injection timing and ignition delay period function, a premixed combustion duration being a combustion chamber throat radius, oil injection pressure and injection orifice diameter function, a premixed combustion mass being an oil injection pressure and injection orifice diameter function, and diffusion combustion being a piston pit depth function;
   step S4: solving target piston geometric parameters and target oil injection parameters based on the mapping relation and the target heat release rate; and
   step S5: designing a combustion system according to the target piston geometric parameters and the target oil injection parameters.

2. The combustion system design method based on the target heat release rate according to claim 1, wherein the step S1 specifically comprises:
   step S101: constructing an effective thermal efficiency calculating zero-dimensional model based on a Miller and Sabathe coupled cycle; and
   step S102: analyzing an influence rule of an isochoric degree and a Miller degree on effective thermal efficiency based on the effective thermal efficiency calculating zero-dimensional model, and obtaining the optimal and ideal heat release rate.

3. The combustion system design method based on the target heat release rate according to claim 2, wherein the isochoric degree is a ratio of an isochoric combustion fuel mass to a total fuel mass, and the Miller degree is an IVC time volume ratio of a conventional cycle to a Miller cycle.

4. The combustion system design method based on the target heat release rate according to claim 1, wherein the step S2 specifically comprises:
   step S201: simulating the ideal heat release rate by the double-Wiebe function based on a one-dimensional GT simulation model and obtaining Wiebe function characteristic parameters;
   step S202: optimizing the Wiebe function characteristic parameters in combination with preset diesel engine limiting conditions; and
   step S203: obtaining the target heat release rate according to the optimized Wiebe function characteristic parameters.

5. The combustion system design method based on the target heat release rate according to claim 4, wherein the Wiebe function is:

$$\frac{dx_1}{d\varphi} = \left[(m_p+1)*6.908*\left(\frac{1}{2\tau}\right)^{m_p+1}(\varphi-\varphi_B)^{m_p}e^{-6.908\left(\frac{1}{2\tau}\right)^{m_p+1}(\varphi-\varphi_B)^{m_p+1}}\right](1-Q_d),$$

$x_l$ is a heat release volume, $m_p$ is a constant, $\tau$ is ignition delay, $\varphi$ is a crank angle, $\varphi_B$ is a crank angle corresponding to a combustion starting point, and $Q_d$ is a combusted fuel mass fraction.

6. The combustion system design method based on the target heat release rate according to claim 1, wherein the step S3 specifically comprises:
   step S301: dividing a heat release rate into a premixed stage and a diffuse stage with a spray wall-impact time as a dividing point, and respectively studying relations among characteristic parameters in the premixed stage, oil injection parameters and combustion chamber shape parameters and among characteristic parameters in the diffuse stage, the oil injection parameters and the combustion chamber shape parameters; and
   step S302: respectively determining a target combustion starting point being an oil injection timing and ignition delay period function, a premixed combustion duration being a combustion chamber throat radius, oil injection pressure and injection orifice diameter function, and a premixed combustion mass being an oil injection pressure and injection orifice diameter function in the premixed stage, and determining diffusion combustion being a piston pit depth function in the diffuse stage.

7. The combustion system design method based on the target heat release rate according to claim 6, wherein the target combustion starting point is the oil injection timing and ignition delay period function:

$$\theta_{SOC}=\theta_{SOI}+\theta_{id}$$

$$\theta_{id}=C_1\exp(C_2/T_a)d_0^{C_3}\rho_A^{C_4}P_{inj}^{C_5}O_2^{C_6},$$

$\theta_{SOC}$ is a combustion starting point, $\theta_{SOI}$ is an oil injection starting point, $\theta_{id}$ is an ignition delay period, $C_1$-$C_6$ are constants, $T_a$ is an environmental temperature, $\rho_A$ is an environmental density, $d_0$ is an injection orifice diameter, $P_{inj}$ is an injection pressure, and $O_2$ is an oxygen concentration.

8. The combustion system design method based on the target heat release rate according to claim 6, wherein when a combustion chamber throat is a wall-impact position, the premixed combustion duration is the combustion chamber throat radius, oil injection pressure and injection orifice diameter function:

$$\sqrt{(r_{th})^2+(x(\varphi)+l_{cl})^2}=K_p((P_i-P_a)/\rho_A)^{0.25}d_0^{0.5}t^{0.5},$$

$r_{th}$ is a combustion chamber throat radius, $x(\varphi)$ is a piston displacement at a crank corner, $l_{cl}$ is a clearance height, $K_p$ is a constant, $P_i$ is an injection pressure, $P_a$ is a backpressure, $\rho_A$ is an environmental density, $d_0$ is an injection orifice diameter, and t is a duration from an oil injection starting point to a wall-impact time, namely the sum of the premixed combustion duration and an ignition delay period.

9. The combustion system design method based on the target heat release rate according to claim 6, wherein the premixed combustion mass is the oil injection pressure and injection orifice diameter function:

$$m_{net}=k_\rho d_0^2(P_i-P_a)^{0.5}\cdot\left(0.5a\cdot\ln\left(\frac{P_i-P_a}{K_p\rho_A d_0}\right)-b\right),$$

$m_{net}$ is a premixed combustion mass, $k_\rho$ is a model parameter, $d_0$ is an injection orifice diameter, $P_i$ is an injection pressure, $P_a$ is a backpressure, a, b and $K_p$ are constants, and $\rho_A$ is an environmental density.

10. The combustion system design method based on the target heat release rate according to claim 6, wherein the diffusion combustion is the piston pit depth function:

$$HRR \propto m\left(\frac{\sqrt{0.5k_{f_{w2}}}}{\sqrt[3]{V_2}} + \frac{\sqrt{0.5k_{f_{w1}}}}{\sqrt[3]{V_1}}\right),$$

HRR is a diffusion combustion heat release rate, m is a diffusion combustion fuel mass, $k_{f_{w1}}$ and $k_{f_{w2}}$ are turbulence intensities corresponding to discrete volumes respectively, and $V_1$ and $V_2$ are discrete volumes respectively.

* * * * *